(12) United States Patent
Hogan

(10) Patent No.: US 8,590,844 B2
(45) Date of Patent: Nov. 26, 2013

(54) TRACK CIRCUIT COMMUNICATIONS

(75) Inventor: Brian Joseph Hogan, Temecula, CA (US)

(73) Assignee: Siemens Rail Auotmation Corporation, Louisville, KY (US)

( * ) Notice: Subject to any disclaimer, the term of this patent is extended or adjusted under 35 U.S.C. 154(b) by 176 days.

(21) Appl. No.: 12/839,231

(22) Filed: Jul. 19, 2010

(65) Prior Publication Data

US 2011/0011985 A1 Jan. 20, 2011

Related U.S. Application Data

(60) Provisional application No. 61/226,416, filed on Jul. 17, 2009.

(51) Int. Cl.
*B61L 21/10* (2006.01)
*B61L 23/16* (2006.01)

(52) U.S. Cl.
USPC ...................... 246/34 B; 246/34 R

(58) Field of Classification Search
USPC ... 246/27, 28 R, 34 R, 39, 34 A, 34 B, 122 R
See application file for complete search history.

(56) References Cited

U.S. PATENT DOCUMENTS

| | | |
|---|---|---|
| 2,106,682 A | 1/1938 | Field at al |
| 2,719,218 A | 9/1955 | Miller |
| 3,268,723 A | 8/1966 | Failor et al. |
| 3,610,920 A | 10/1971 | Frielinghaus |
| 3,966,149 A * | 6/1976 | Matty et al. ................. 246/34 R |
| 4,015,082 A | 3/1977 | Matty et al. |
| 4,065,081 A | 12/1977 | Huffman et al. |
| 4,172,576 A | 10/1979 | Svet, Jr. et al. |
| 4,324,376 A | 4/1982 | Kuhn |
| 4,498,650 A | 2/1985 | Smith et al. |
| 4,582,279 A | 4/1986 | Pontier |
| 4,723,739 A * | 2/1988 | Franke ........................ 246/34 C |
| 4,737,968 A | 4/1988 | Norton et al. |
| 4,855,737 A | 8/1989 | Poole |
| 4,868,864 A | 9/1989 | Tjahjadi |
| 5,029,780 A | 7/1991 | Peel |
| 5,309,113 A | 5/1994 | Mimura |

(Continued)

FOREIGN PATENT DOCUMENTS

| | | |
|---|---|---|
| CA | 1149918 | 7/1983 |
| CN | 1491846 | 4/2004 |

(Continued)

OTHER PUBLICATIONS

International Search Report issued in International Application No. PCT/US2010/042475, mailed Feb. 8, 2011.

(Continued)

*Primary Examiner* — Zachary Kuhfuss
(74) *Attorney, Agent, or Firm* — DLA Piper LLP US

(57) ABSTRACT

An overlay track circuit is used to transmit information through a block of railroad tracks. In one embodiment, one of a plurality of codes assigned to a receiver/transmitter pair are used to represent each information segment (which may be one or more bits) of an information signal. In another embodiment, bits of the information signal are transmitted between periodic repetitions of a code associated with the transmitter/receiver pair. The modulation may be performed using a frequency shift key technique. Track circuits may be connected to relay information between adjacent blocks of track.

12 Claims, 3 Drawing Sheets

(56) References Cited

U.S. PATENT DOCUMENTS

| | | | |
|---|---|---|---|
| 5,398,894 A * | 3/1995 | Pascoe | 246/28 R |
| 5,453,715 A | 9/1995 | Lee | |
| 5,469,112 A | 11/1995 | Lee | |
| 5,553,064 A | 9/1996 | Paff | |
| 5,554,982 A | 9/1996 | Shirkey et al. | |
| 5,590,855 A | 1/1997 | Kato et al. | |
| 5,633,895 A | 5/1997 | Powell, II et al. | |
| 5,720,454 A * | 2/1998 | Bachetti et al. | 246/34 R |
| 5,739,768 A | 4/1998 | Lane et al. | |
| 5,864,304 A | 1/1999 | Gerszberg et al. | |
| 5,890,682 A | 4/1999 | Welk | |
| 5,954,299 A | 9/1999 | Pace | |
| 6,011,508 A | 1/2000 | Perreault et al. | |
| 6,011,816 A | 1/2000 | Sanielevici et al. | |
| 6,025,789 A | 2/2000 | Lane et al. | |
| 6,145,792 A | 11/2000 | Penza | |
| 6,179,252 B1 | 1/2001 | Roop et al. | |
| 6,218,961 B1 | 4/2001 | Gross et al. | |
| 6,220,552 B1 | 4/2001 | Ireland | |
| 6,396,869 B1 | 5/2002 | Park | |
| 6,572,056 B2 | 6/2003 | Berry et al. | |
| 6,823,026 B2 | 11/2004 | Mueller et al. | |
| 6,830,224 B2 | 12/2004 | Lewin et al. | |
| 7,017,864 B2 * | 3/2006 | McAllister | 246/34 R |
| 7,098,774 B2 | 8/2006 | Davenport et al. | |
| 7,254,467 B2 | 8/2007 | Fries et al. | |
| 7,523,893 B2 | 4/2009 | Francis et al. | |
| 7,575,202 B2 | 8/2009 | Sharkey et al. | |
| 7,618,010 B2 | 11/2009 | Fries | |
| 7,832,691 B2 | 11/2010 | Reibeling et al. | |
| 2004/0181321 A1 | 9/2004 | Fries et al. | |
| 2007/0084974 A1 | 4/2007 | Sharkey et al. | |
| 2008/0101481 A1 | 5/2008 | Al-Eidan | |

FOREIGN PATENT DOCUMENTS

| | | |
|---|---|---|
| DE | 10 2004 057459 | 6/2006 |
| EP | 0 165 048 | 12/1985 |
| EP | 0 878 373 | 11/1998 |
| EP | 1338492 | 8/2003 |
| GB | 1546942 | 5/1979 |
| JP | 11020702 | 1/1999 |
| JP | 2006168382 | 6/2006 |
| JP | 2006327290 | 12/2006 |
| JP | 2008-137400 | 6/2008 |
| KR | 10-2003-0011127 | 2/2003 |
| KR | 10-2004-0060261 | 7/2004 |
| KR | 10-2004-0106864 | 12/2004 |
| KR | 10-2009-0104379 | 10/2009 |
| WO | WO 91/11356 | 8/1991 |
| WO | WO 2004/071839 | 8/2004 |

OTHER PUBLICATIONS

Written Opinion issued in International Application No. PCT/US2010/042475, mailed Feb. 8, 2011.

English language abstract of JP 2008-137400, published Jun. 19, 2008.

Machine English language translation of JP 2008-137400, published Jun. 19, 2008.

English language abstract of KR 10-2009-0104379, published Oct. 6, 2009.

English language abstract of KR 10-2004-0106864, published Dec. 18, 2004.

English language abstract of KR 10-2003-0011127, published Feb. 6, 2003.

English language abstract of KR 10-2004-0060261, published Jul. 6, 2004.

GE Transportation ElectroLogIXS XP4: For Crossing Prediction.

Engelbrecht, Roelof J., "The Effect of Variation in Railroad Warning Time on Traffic Signal Preemption," Texas Transportation Institute, pp. 1-17.

Victrack Access, "Low Cost Level Cross Warning Device," pp.1-14, First Release, Jun. 6, 2008.

C3 Trans Systems LLC, "New Crossing Technology, Model HRI 2000: Improved Grade Crossing Warning System," 2 pages, 2004.

Russel, Michael, "High-Speed Rail Program: Integrated Quad Gate Crossing Control System," IDEA, Transportation Research Board, National Research Council, pp. 1-28, Dec. 2001.

Li, Meng et al., "Analysis Toward Mitigation of Congestion and Conflicts at Light Rail Grade Crossings and Intersections," California PATH Research Report, UCB-ITS-PRR-2009-9, Final Report for Task Order 5407; pp. 1-55, Jan. 2009.

http://www.southbaysignal.com/crossing.htm, South Bay Signal LLC, Grade Crossing Warning Systems, printed Apr. 20, 2010.

English language abstract of TW 455553, published Sep. 21, 2001.

English language abstract of CN 1491846, published Apr. 28, 2004.

English language abstract of JP 11-020702, published Jan. 26, 1999.

English language abstract of JP 2006-327290, published Dec. 7, 2006.

Machine English language translation of JP 2006-327290, published Dec. 7, 2006.

English language abstract of JP 2006-168382, published Jun. 29, 2006.

Machine English language translation of JP 2006-168382, published Jun. 29, 2006.

English language abstract of SU 1592204, published Sep. 15, 1990.

"How Railroad Crossing Signals Work", http://matt.zont.org/signals/crossing/xngworks/xngworks/html, last revised Jan. 10, 2007, 28 pages.

U.S. Appl. No. 12/724,800.

English language abstract of DE 10 2004 057459, Published Jun. 1, 2006.

Machine English language translation of DE 10 2004 057459, Published Jun. 1, 2006.

Crawford E. Staples, "AFO Can Solve Highway Crossing Problems", Railway Signaling and Communications, vol. 52, pp. 20-26 (Sep. 1964).

U.S. Application No. 12/724,800.

* cited by examiner

TRACK CIRCUIT COMMUNICATIONS

CROSS-REFERENCE TO RELATED APPLICATIONS

This application claims priority to U.S. provisional application Ser. No. 61/226,416, filed Jul. 17, 2009 and entitled "Track Circuit Communications," the entire contents of which are hereby incorporated by reference herein. This application is also related to U.S. patent application Ser. No. 12/724,800, filed Mar. 16, 2010 and entitled "Decoding Algorithm for Frequency Shift Key Communications."

BACKGROUND

Track circuits are used in the railroad industry to detect the presence of a train in a block of track. An AC overlay track circuit includes a transmitter and a receiver, with the transmitter configured to transmit an AC signal through the track rails at one end of a block of track and the receiver connected to the rails at the other end of the block and configured to detect the signal. Other than the connection through the track rails, there is typically no connection between the transmitter and receiver for a block. When a train is present in a block of track monitored by a track circuit, the train shunts, or shorts, the two rails, with the result that no signal is received at the receiver. Thus, the receiver uses the presence or absence of a detected signal to indicate whether or not a train is present in the block. It is therefore very important that a receiver in a particular block of interest not interpret spurious signals or stray signals from a transmitter in another block of track or some other transmitter as originating from the transmitter associated with the block of interest.

Safetran's existing AC overlay track circuit product, the PSO III, had the capability of transmitting on 16 different frequencies. The use of different frequencies was intended to allowed track circuits to operate in close proximity to each other without fear that signals from a transmitter in a first block would be received by a receiver in a second block and be misinterpreted as originating from the transmitter associated with the second block. However, due to certain installations in dense track areas, one of two digital codes (A and C) were further used in order to provide a total of 32 unique combinations of frequencies and codes. The carrier signal is modulated by the code using a FSK technique.

In order to generate one of the 16 different frequencies, the PSO III employed one of 16 different transmitter cards and 16 different receiver cards, with separate versions of each of these cards for the two different addresses. Thus, keeping replacement cards for all of the different frequencies and addresses on hand in order to replace any circuit cards that became defective required stocking a large number of different circuit cards.

DETAILED DESCRIPTION

In the following detailed description, a plurality of specific details, such as particular encoding and decoding algorithms, are set forth in order to provide a thorough understanding of the preferred embodiments discussed below. The details discussed in connection with the preferred embodiments should not be understood to limit the present invention. Furthermore, for ease of understanding, certain method steps are delineated as separate steps; however, these steps should not be construed as necessarily distinct nor order dependent in their performance.

In order to alleviate the need to manufacture and store multiple versions of transmitter and receiver circuit cards as discussed above, embodiments of the invention employ user programmable transmitter and receiver circuit cards. In some embodiments, the transmitters are capable of generating any one of the 16 different frequencies and any one of 256 different 8 bit long codes under control of the user, and the receivers can automatically detect any of the 16 frequencies and 256 codes. Other numbers of frequencies and codes are utilized in other embodiments. Any encoding/decoding technique known in the art may be utilized to encode/decode the codes. Some embodiments employ a frequency shift key (FSK) technique. A decoding algorithm for an FSK receiver is disclosed in commonly-owned, co-pending U.S. patent application Ser. No. 12/724,800, filed Mar. 16, 2010 and entitled "Decoding Algorithm for Frequency Shift Key Communications," the entire contents of which is hereby incorporated herein by reference. This approach allows a customer or supplier to stock only a single transmitter card and a single receiver card rather than 16 of each.

The selection of a particular code and frequency can be used to convey information. Furthermore, if the codes are changed dynamically over time, a significant amount of information can be transmitted during times when no train is present in the block to prevent the transmitted signal from being received at the receiver. This provides the possibility of using the track circuits to transmit information along the track rails in a track block. Information can be transmitted over longer distances by linking the track circuits together in a relay fashion. One or more of the receivers can be connected to output data to a wayside device, which can be used to control other devices (e.g., a remotely controlled railroad switch) or simply provide the data to the devices. This provides the ability to replace wayside communications lines.

Figure 1:
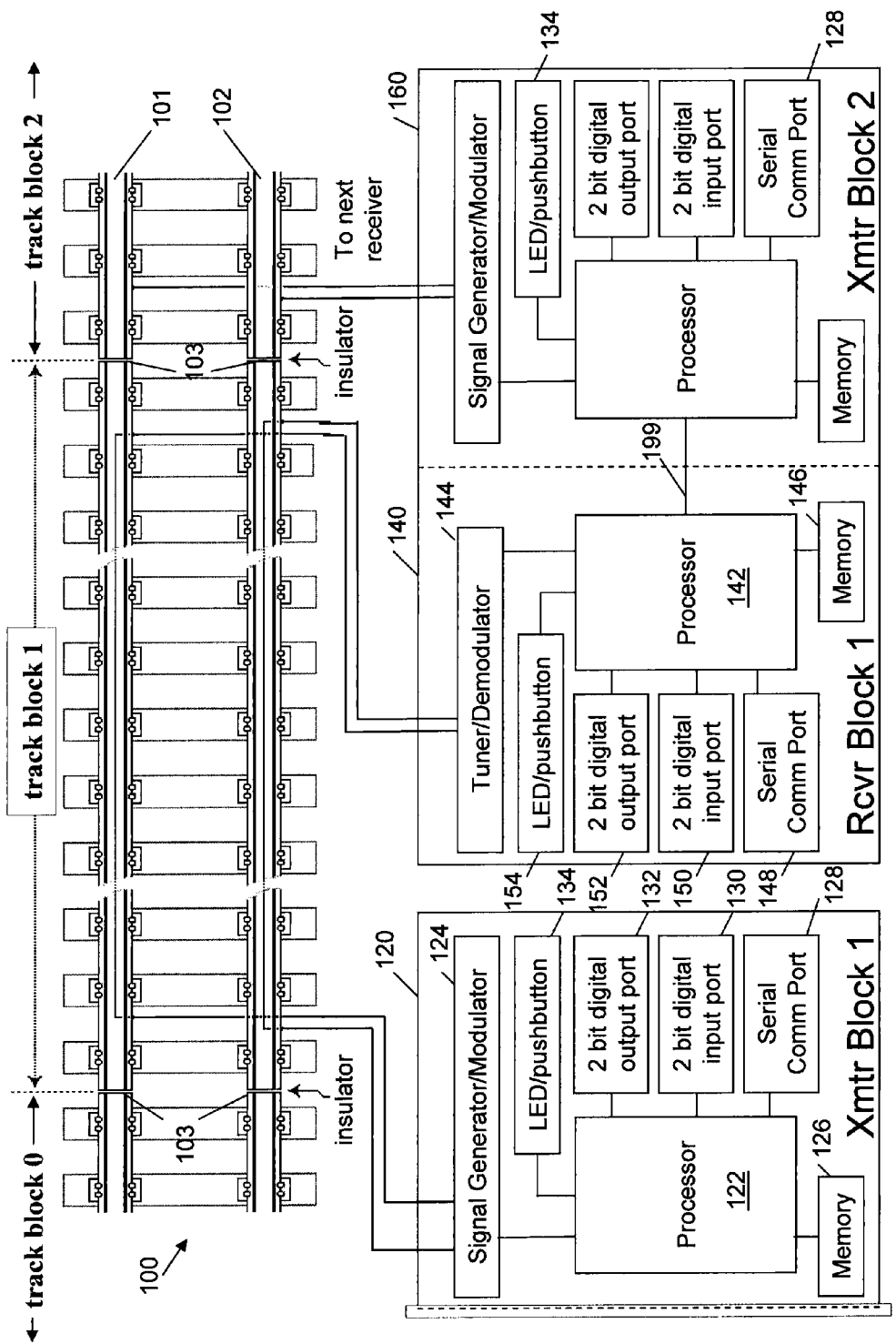
FIG. 1 is block diagram of receiver and transmitter circuits connected to a railroad track according to one embodiment of the invention.
Figure 2:
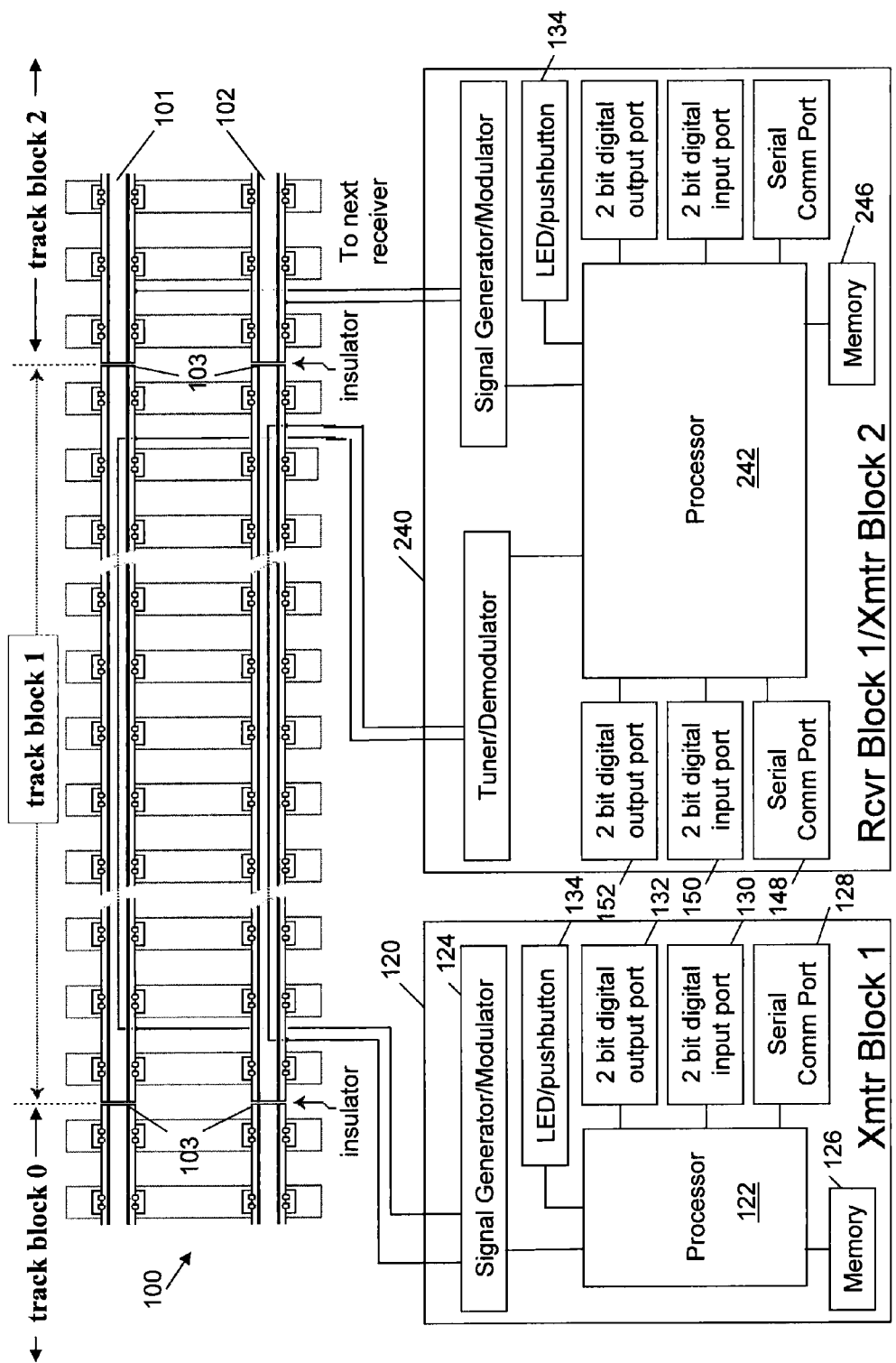
FIG. 2 is a block diagram of receiver and transmitter circuits connected to a railroad track according to a second embodiment of the invention.
Figure 3:
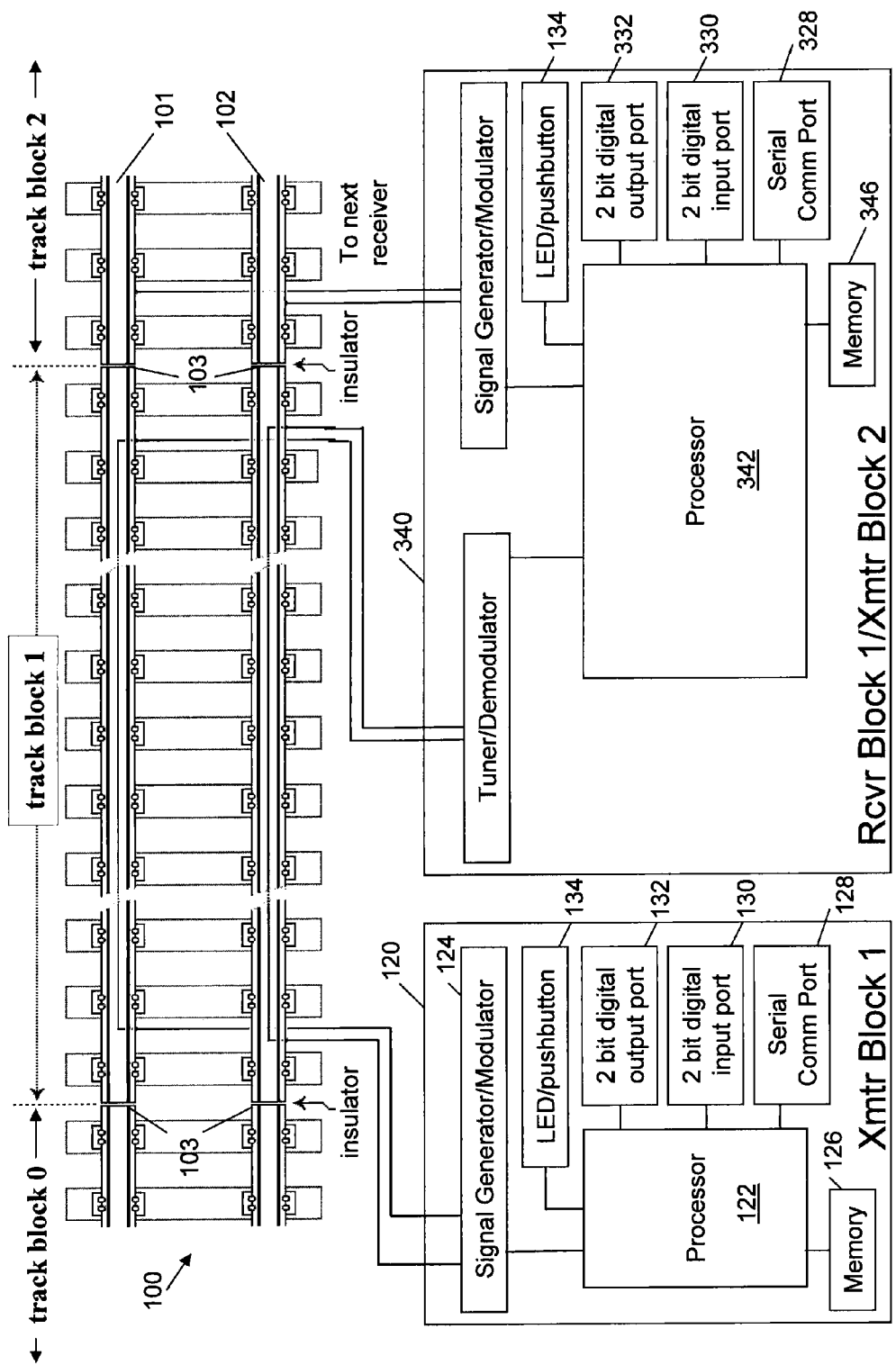
FIG. 3 is a block diagram of receiver and transmitter circuits connected to a railroad track according to a third embodiment of the invention.

The attached FIGS. 1-3 show three possible implementations of receivers and transmitters that may be utilized to transmit information via the rails of a train track as discussed above. It should be understood, however, that other configurations of receivers and transmitters may also be used.

In FIG. 1, a track 100 divided into three blocks 0, 1 and 2. The track includes two rails 101, 102. FIG. 1 illustrates insulators 103 at the boundaries of block 1, but it should be understood that the insulators 103 are not necessary and are not present in some embodiments. A transmitter 120 is attached to the rails 101, 102 near one end of block 1, and a receiver 140 is attached to the rails 101, 102 near the opposite end. In practice, the transmitter 120 and the receiver 140 are placed as close to respective ends of a block as practicable when insulators 103 are present. The receiver 140 for block 1 and the transmitter 160 for block 2 are shown as two separate circuit cards with a physical communications link 199 between the processors, housed in a common chassis. Those of skill in the art will recognize that such embodiments may be located in close physical proximity to the insulator between two separate blocks. The receiver for one block and transmitter for an adjacent blocks are often collocated because the end of one block is immediately adjacent to the start of another block. FIG. 1 also illustrates a transmitter 120 for block 1, which may be attached to a receiver for block 0

(not shown in FIG. 1). This implementation is suitable for use with any of the techniques 1-4 described below (the physical communications link 199 in FIG. 1 is only necessary for technique 4).

The transmitter 120 is controlled by a processor 122, which is connected to a memory 126, a serial communications port 128, two 2-bit digital ports 130, 132 and an LED/pushbutton assembly 134. One of the two bit ports 130 is configured for output and the other two bit port 132 is configured for input in this embodiment. The transmitter can accept digital data via the port 128 or 130 to be transmitted via the rails 101, 102. The transmitter may also transmit a fixed code stored in the memory 126. The processor 122 controls a signal generator/modulator 124 to generate a carrier signal at a desired frequency and modulate the carrier signal with digital data or a code using a binary frequency shift key (BFSK) modulation technique. Any conventional BFSK modulator may be employed.

The receiver 140 also includes a processor 142 connected to a memory 146. A tuner/demodulator 144 receives a BFSK signal transmitted via the rails by the transmitter 120 and demodulates the digital data or code carried by the signal. The tuner/demodulator is discussed in further detail in the aforementioned co-pending application. Also connected to the processor 142 is a serial communications port 148, two 2-bit digital input/output ports 150, 152 and an LED/pushbutton assembly 154. As discussed above, information demodulated from the received signal may be output to another transmitter (e.g., the transmitter 160) for transmission to a subsequent block, or may be output to an attached wayside device such as a signal.

FIG. 2 shows an implementation in which a receiver and transmitter are implemented on a single circuit card 240 using a single processor 242 connected to a single memory 246 on which transmit and receive routines run simultaneously (i.e., in a time slice arrangement that appears to be simultaneous), with a logical link between them when implementing embodiment 4 discussed below. The circuit card 240 retains the same communications and two-bit digital ports as the circuit card 140 of FIG. 1 and is similar in respects other than the combined processor 242 and memory 246.

FIG. 3 shows another alternative implementation in which a receiver and transmitter are implemented on a single circuit card 340 using a single processor 342 connected to a single memory 346 on which transmit and receive routines run simultaneously (i.e., in a time slice arrangement that appears to be simultaneous) as in the embodiment of FIG. 2, with a logical link between them when implementing embodiment 4 discussed below. The circuit card 340 includes only a single 2-bit output port 332, a single 2-bit input port 330, and a single serial communications port 328.

There are four different ways in which the particular code and frequency output by the transmitter is controlled in various embodiments:

User Selection (Technique 1):

As shown in FIGS. 1-3, in some embodiments the transmitter has a small LED readout and button assembly 134 with two buttons that allow the user to set the frequency and code. Once set, the frequency and code remain static until reset by a user. This method is not intended to transmit information but rather is simply a method for configuring the transmitter.

Via 2 Bit Digital Port (Technique 2):

In some embodiments, the transmitter includes a 2-bit digital input port 130 which provides the ability to select from among four different codes. The processor is configured to control the signal generator/modulator to select a particular code or frequency based on these digital inputs. Similarly, the receiver can be programmed to output a particular signal on the 2 bit output port 152 depending on which particular code was received. This arrangement allows the receiver from one block to control the transmitter in the next block (these two devices are logically separate but often provided in the same physical enclosure because, as shown in the figure, the track interface for the receiver from one block is near the track interface for the transmitter for the next block) to act as a repeater by physically coupling the 2 bit digital port output from the receiver to the 2 bit digital port input to the transmitter.

Via Serial Comm Port (Technique 3):

In some embodiments, the transmitter includes a serial communications port 128 that can be used to input data that is to be transmitted in a manner similar to a conventional modem. The processor communicates each bit of the data by selecting an appropriate code. In the simplest embodiment, only two codes are necessary, one for a logical 1 and the other for a logical 0. If more unique codes are selected, the time slot in which each code is transmitted conveys multiple bits of information (e.g., 4 unique codes allows the transmission of 2 bits of logical data in one time slot). As with the previous example, a repeater function could be effectively realized by coupling the serial port 148 from a receiver to a serial port 128 of a co-located transmitter for the next block. This allows, for example, a first device that is transmitting information to be connected to the serial comm port of a transmitter in a first block, the comm port of the receiver of the first block to be connected to the comm port of the transmitter in the second block, and the comm port of the receiver in the second block to be connected to an intended recipient of the information from the first device.

Via a Logical or Physical Connection to the Receiver (Technique 4):

As discussed above, the receiver and transmitter are often manufactured in a single physical package. However, there has previously not been any logical link between them. In this embodiment, the information represented by the frequency/code detected by a receiver is communicated to the transmitter (via the communications link 199 in shown in FIG. 1 or logically when a single processor controls the transmitter and receiver as in FIGS. 2 and 3), where a corresponding (albeit different) code/frequency representative of the same information is transmitted.

The codes can be used to transmit information. For example, if there were 256 possible codes (i.e., an 8 bit code word were to be used), then two or more of the 256 distinct code words could be assigned to each transmitter/receiver pair. In the event that two code words were assigned, the transmitter would transmit one of the two distinct codes for a logic "1" and the other of the two codes for a logic "0" of the information signal. For example, if the two 8 bit code words assigned to a transmitter were 01010101 and 11110000, the transmitter would transmit 01010101 when the information signal is a logical "1" and 1111000 when the information signal is a logical "0". The receiver would be configured to interpret the reception of either of the two codes (or their amplitudes) as evidence of absence of a train in the track block, and would also interpret the received codes as symbols representing bits of the information signal, thereby enabling data transmission using the tracks as the transmission medium. If a code other than 01010101 or 1111000 were received, the receiver would reject the received code as spurious (possibly originating from another track circuit) and declare the associated block of track as occupied.

Those of skill in the art will recognize that the baud rate achievable using this technique depends on the number of unique codes assigned to a receiver/transmitter pair. If two unique codes are assigned, then each 8 bit code word represents one bit of data as discussed above. If 4 unique codes are assigned, then each 8 bit code word can represent an information segment of two data bits; if 8 code words are assigned to each pair, then each 8 bit code word represents a three bit segment of the information signal; etc. An advantage to this technique is that a valid code is always being transmitted by the transmitter, so the receiver can confirm that a valid code is being received as quickly as possible. Thus, operation of the track occupancy function of the track circuit is similar to traditional operation (albeit somewhat different in that more than one code for a single track is possible at any one time).

Alternatively, the transmitter could be configured to transmit a unique code assigned to a receiver/transmitter pair at some periodic rate (e.g., once every 10 seconds, once every minute) in order to allow discrimination from signals from other track circuit signals, and transmit data between the code transmissions. This is possible because the track condition is typically fairly static (and so the need to confirm that received transmissions originate from the correct transmitter by confirming receipt of a correct code is not that time-critical) and because the amplitude of the received transmission of any signal (whether data or a code word) can be used to determine the absence or presence of a train. An advantage with this technique is a faster baud rate as compared to the technique discussed above.

It will be apparent to those of skill in the art that numerous variations in addition to those discussed above are also possible. Therefore, while the invention has been described with respect to certain specific embodiments of methods and devices for performing word selection, it will be appreciated that many modifications and changes may be made by those skilled in the art without departing from the spirit of the invention. It is intended therefore, by the appended claims to cover all such modifications and changes as fall within the true spirit and scope of the invention.

Furthermore, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method for communicating digital data through a block of railroad track using an overlay track circuit comprising the steps of:
    inputting by a track circuit transmitter connected to one end of a block of railroad track a digital information signal;
    selecting by the track circuit transmitter one of a plurality of multi-bit codes for each information segment of the digital information signal, each of the plurality of multi-bit codes for each information segment of the digital information signal being different from multi-bit codes used by adjacent track circuits, wherein the digital information signal has at least two unique portions and wherein at least two unique multi-bit codes are selected by the track circuit transmitter;
    modulating by the track circuit transmitter each of the multi-bit codes onto a carrier signal and transmitting the carrier signal through the block of railroad track to a receiver connected to a second end of the block of track;
    demodulating by the receiver each of the multi-bit codes;
    decoding by the receiver the multi-bit codes to recover the digital information signal; and
    outputting by the receiver the digital information signal.

2. The method of claim 1, wherein the codes are modulated onto the carrier signal using a frequency shift key technique.

3. The method of claim 1, wherein the information segment of the digital information signal is a single bit.

4. The method of claim 1, wherein the receiver outputs the digital information signal to a second track circuit transmitter for an adjacent block.

5. The method of claim 1, wherein the receiver outputs the digital information signal to a wayside device.

6. The method of claim 5, wherein the wayside device is a railroad track switch.

7. A system for communicating digital data through the rails of a railroad track comprising:
    a track circuit transmitter connectable to one end of a block of railroad track, the track circuit transmitter configured to input a digital information signal, select one of a plurality of multi-bit codes for each information segment of the digital information signal, modulate each of the multi-bit codes onto a carrier signal, and transmit the carrier signal through the railroad track; and
    a track circuit receiver connectable to a second end of a block of railroad track, the track circuit receiver being configured to receive the carrier signal via the railroad track, demodulate each of the multi-bit codes, decode the multi-bit codes to recover the digital information signal, and output the digital information signal;
    wherein each of the plurality of multi-bit codes for each information segment of the digital information signal is different from multi-bit codes used by adjacent track circuits.

8. The system of claim 7, wherein the codes are modulated onto the carrier signal using a frequency shift key technique.

9. The system of claim 7, wherein the information segment of the digital information signal is a single bit.

10. The system of claim 7, wherein the receiver outputs the digital information signal to an output port connectable to a second track circuit transmitter connectable to an adjacent block of railroad track.

11. The system of claim 7, wherein the receiver outputs the digital information signal to a wayside device.

12. The system of claim 11, wherein the wayside device is a railroad track switch.

* * * * *